United States Patent [19]
Le Suer

[11] 3,798,012
[45] Mar. 19, 1974

[54] COMBUSTION PROCESS AND FUEL COMPOSITIONS

[75] Inventor: William Monroe Le Suer, Cleveland, Ohio

[73] Assignee: The Lubrizol Corporation, Wickliffe, Ohio

[22] Filed: June 9, 1971

[21] Appl. No.: 151,538

Related U.S. Application Data

[63] Continuation of Ser. No. 89,031, Nov. 12, 1970, abandoned, which is a continuation of Ser. No. 700,301, Jan. 24, 1968, abandoned, which is a continuation-in-part of Ser. Nos. 474,479, July 23, 1965, abandoned, and Ser. No. 468,558, Sept. 10, 1965, abandoned, and Ser. No. 665,934, Sept. 6, 1967, abandoned, which is a continuation of Ser. No. 394,337, Sept. 3, 1934, abandoned.

[52] U.S. Cl............................. 44/51, 44/57, 44/66, 44/70, 44/76
[51] Int. Cl........... C10l 1/18, C10l 1/30, C10l 1/32

[58] Field of Search................. 44/51, 57, 66, 70, 76

[56] References Cited
UNITED STATES PATENTS
3,637,356  1/1972  Vanderlinden et al................. 44/51

Primary Examiner—Daniel E. Wyman
Assistant Examiner—W. J. Shine
Attorney, Agent, or Firm—Adams, Jr. James W.

[57] ABSTRACT

The invention disclosed herein is directed to an improved combustion process whereby the fuel is efficiently utilized and the formation of undesirable exhaust smoke is reduced. The combustion process comprises the burning of a fuel in which there is incorporated a small amount of metal salts having a particle size less than about 800 microns. The invention relates further to improved fuel compositions containing such metal salts.

22 Claims, No Drawings

COMBUSTION PROCESS AND FUEL COMPOSITIONS

This application is a continuation of copending application Ser. No. 89,031, filed Nov. 12, 1970 now abandoned, which, in turn, is a continuation of application Ser. No. 700,301, filed Jan. 24, 1968 which is a continuation-in-part of abandoned application Ser. No. 474,479, filed July 23, 1965; Ser. No. 486,558, filed Sept. 10, 1965; and Ser. No. 665,934, filed Sept. 6, 1967, the last being a continuation of earlier filed application Ser. No. 394,337, filed Sept. 3, 1964, the latter five applications now abandoned.

This invention relates to the operation of internal combustion engines. In a more particular sense it relates to improved operation of diesel and jet engines which tend to produce black exhaust smoke.

Diesel and jet engines performing under severe service conditions such as occur in the operation of heavy automotive equipment, ships and trucks have a tendency to produce black exhaust smoke, especially on rapid acceleration of the engine. The smoke creates a problem of air pollution and in many localities it constitutes a violation of the local law to so pollute the air.

Accordingly, it is a principal object of this invention to provide an improved method of operating diesel and jet engines.

It is also an object of this invention to provide an improved method of operating diesel and jet engines whereby the formation of black exhaust smoke is minimized.

It is also an object of this invention to provide improved fuel compositions useful for operating internal combustion engines, and in particular, diesel and jet engines.

These and other objects are attained in accordance with this invention by providing a combustion process involving the burning of a diesel or jet fuel in an internal combustion engine tending to produce smoke, which comprises burning said fuel in the presence of at least about 0.01 percent by weight of a metal salt of an inorganic acid selected from the class consisting of carbonic, sulfurous, and sulfuric acids, wherein the metal is a Group I or Group II metal, said metal salt having a particle size less than about 800 microns.

The above metal salts are effective as smoke-suppressing agents in the process. The physical state and the chemical composition of the particular metal salt during combustion are critical to its effectiveness in reducing the formation of black smoke in the engine. It must be of relatively small particle size, e.g., less than about 800 microns. In general, a metal salt having a smaller particle size is preferred and one having an average particle size from about 0.0004 to about 50 microns is especially desirable. Further, it must be in the required finely divided form at the time when the combustion of the fuel takes place. The physical state of the smoke suppressing agent prior to that time is not critical. Thus, the smoke suppressing agent may be in a fluid form or agglomerated solid form of large particle size before combustion takes place. For instance, it may be dissolved or dispersed in a liquid carrier or mechanically mixed with the carrier before it is introduced into the combustion zone. It may further be chemically combined with another substance in the form of a chemical complex which is capable of releasing the smoke suppressing agent in the desired particle size during combustion of the fuel.

To be effective, the metal salt must be present at a concentration of at least about 0.01 percent by weight of the fuel being burned in the combustion chamber. Its concentration may be as high as 5 percent by weight of the fuel or even higher. In the case of polymeric metal salt additive such as is described hereinbelow, the effective concentration of the smoke suppressing agent should be at least about 0.1 percent; it may be as high as about 5 percent or higher, but is usually less than about 2 percent by weight of the fuel.

The metal salt, as indicated previously, comprises a Group I or Group II metal salt of an inorganic acid such as carbonic, sulfurous, or sulfuric acid. It includes principally carbonates, sulfites, and sulfates of the metal although it may include also bicarbonates, bisulfites, etc. The metal is illustrated by lithium, potassium, sodium, copper, magnesium, zinc. cadmium, strontium, calcium or barium. Calcium and barium salts of carbonic acid are preferred. Mixtures of metal salts likewise are useful.

The metal salt may be either monomeric or polymeric. The term "monomeric" salt is used to designate ordinary, inorganic metal salts such as $NaCO_3$, $Na_2SO_4$, $Na_2SO_3$, $CuSO_4$, $Cu_2SO_4$, $ZnCO_3$, $BaCO_3$ and $CaSO_4$. The term "polymeric" salt is used to designate a salt characterized by the molecular structure of a polymeric metal salt unit attached to an oleophilic group such as is present in $$A—(M-O-Y-O)_n—B$$

wherein M is a Group I or Group II metal, Y is

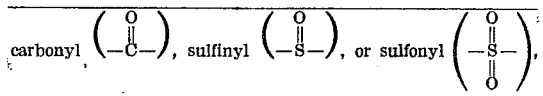

$n$ is greater than 1 and preferably from about 2 to 40, A is an acidic oleophilic group, and B is a chain-ending group such as hydrogen or an oleophilic group such as MA or M-O-Y-O-M-A. The polymeric unit is illustrated by

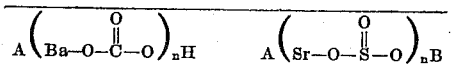

As indicated previously, the polymeric unit is attached to at least one acidic oleophilic group as an end group. The oleophilic group usually contains at least about eight aliphatic carbon atoms and may contain as many as 400 or more aliphatic carbon atoms. It is illustrated by the anionic group derived from an oil-soluble sulfonic acid, carboxylic acid, phosphonic acid, phosphinic acid, enols, alcohols, etc.

The oil-soluble sulfonic acids from which the oleophilic group may be derived are illustrated by an alkyl sulfonic acid or alkaryl sulfonic acid having at least 12 aliphatic carbon atoms in the alkyl radical. It may be, for example, mahogany sulfonic acid, dodecyl benzene sulfonic acid, di(dodecyl)benzene sulfonic acid, dodecylnaphthalene sulfonic acid, bright stock sulfonic acid, tetra(tridecyl)benzene sulfonic acid, octadecylbenzene sulfonic acid, polypropene(molecular weight of 1,500)-substituted benzene sulfonic acid, polybutene(molecular weight of 5,000)-substituted benzene sulfonic acid, etc.

The oil-soluble phosphonic or phosphinic acids may be hydrocarbon substituted oxyphosphonic or oxyphosphinic acids or the corresponding thio analogs thereof such as thiophosphonic, monothiophosphinic or dithiophosphinic acids wherein the hydrocarbon substituent may be alkyl or alkaryl having at least about 12 aliphatic carbon atoms in the alkyl radical. Specific examples include polybutenyl(molecular weight of 1,000)-phosphonic acid, dipolyisobutenyl(molecular weight of 750)-phosphinic acid, dipolyisobutenyl(molecular weight of 1,500)-phosphinomonothioic acid, dipolypropenyl(molecular weight of 2,000)-phosphinodithioic acid, didodecylphosphinodithioic acid, dioctadecylphosphinodithioic acid or mixtures of acids such as are derived by the reaction of an olefin polymer (e.g., polyethylene, polypropylene, polybutene, copolymer of isobutene and styrene) with a phosphorizing agent such as phosphorus pentasulfide, phosphorus heptasulfide, phosphorus sesquisulfide, phosphorus pentoxide, phosphorus oxychloride, phosphorus trichloride and sulfur, phosphorus trichloride and oxygen, phosphorus and sulfur dichloride, phosphorus and sulfur monochloride, phosphorus oxysulfide, phosphorus oxybromide, etc.

A useful class of oil-soluble phosphorus acids comprises acidic phosphorized aliphatic or alkyl aromatic hydrocarbons, with the aliphatic hydrocarbons being preferred. Such hydrocarbons include, for example, the white oils and other liquid petroleum oils having at least about 12 carbon atoms and include also synthetic hydrocarbons such as are obtained by the reduction of fatty oils. Also included, and preferred, are the olefin polymers having molecular weights between about 150 and 48,000, especially about 500–3,000. These include homopolymers and copolymers of mono-olefins having from two to 12 carbon atoms, e.g., ethylene, 1-hexene, 1-octene, 2-methyl-1-heptene, 3-cyclohexyl-1-butene, 1-decene, 2-methyl-5-propyl-1-hexene, etc. Also useful are the interpolymers of such mono-olefins with other interpolymerizable olefinic substances such as aromatic olefins, cycloaliphatic olefins, and polyolefins. These interpolymers include, for example, those prepared by polymerizing isobutene with styrene; isobutene with butadiene; propene with isoprene; ethylene with piperylene; isobutene with chloroprene; isobutene with p-methylstyrene; 1-hexene with 1,3-hexadiene; isobutene with styrene and piperylene; and the like.

The relative proportions of the mono-olefins to the other olefinic monomers in the interpolymers may vary within wide ranges provided that the polyolefin, if used, is not present in sufficiently high proportions as to cause substantial crosslinking and insolubility. Specific examples of the useful interpolymers include the copolymer of 95 percent (by weight) of isobutene with 5 percent of styrene; the terpolymer of 98 percent of isobutene with 1 percent of piperylene and 1 percent of chloroprene; the terpolymer of 95 percent of isobutene with 2 percent of 1-butene and 3 percent of 1-hexene; the terpolymer of 60 percent of isobutene with 20 percent of 1-pentene and 20 percent of 1-octene; the copolymer of 80 percent of 1-hexene and 20 percent of 1-heptene; the terpolymer of 90 percent of isobutene with 2 percent of cyclohexene and 8 percent of propene; and the copolymer of 80 percent of ethylene and 20 percent of propene.

The olefin polymer may be phosphorized by treatment with such reagents as phosphorus sulfides, phosphorus halides, phosphorus oxyhalide, phosphorus thiohalides, chlorine and a phosphorus trihalide, sulfur and yellow phosphorus, sulfur and a phosphorus trihalide, or yellow phosphorus and a sulfur halide. Various techniques for phosphorization are known. A commonly used method involves simply mixing the hydrocarbon with the phosphorizing agent at the desired temperature, usually above 80°C. and preferably between 100° and 300°C. Another method consists of chlorinating the olefin polymer and reacting the chlorinated polymer with a phosphorizing agent.

The amount of the phosphorizing agent to be used depends upon the nature of the product desired. For most applications involving phosphorization of olefin polymers, products having a phosphorus content from 0.05 to 10 percent, usually from 0.1 to 5 percent, are desirable. Thus, the relative proportion of the phosphorizing agent to be used is such as to provide from about 0.05 to 10 parts (by weight), preferably from 0.1 to 5 parts, of phosphorus per 100 parts of the olefin polymer in the reaction mixture. In most instances, from 0.1 part to 50 parts of the phosphorizing agent is used per 100 parts of the olefin polymer.

The oil-soluble carboxylic acids are illustrated by mono-carboxylic acids such as dodecanoic acid, octadecanoic acid, hexatriacontanoic acid, oleic acid, stearic acid, oleostearic acid, linoleic acid, myristic acid, xylylstearic acid, dodecylbenzoic acid, di(octadecyl)-naphthoic acid, naphthenic acid, or other fatty acids having at least about 12 aliphatic carbon atoms in the molecule. Polycarboxylic acids such as alkyl- or alkenyl succinic acids wherein the alkyl or alkenyl substituent has from about 12 to 500 aliphatic carbon atoms are useful. They are exemplified by polyisobutene(molecular weight of 1,000)-substituted succinic acid, polypropene(molecular weight of 700)-substituted succinic acid.

The oil-soluble enols should contain at least about 12, and preferably less than about 30, aliphatic carbon atoms. They may be tautomeric aldehydes or ketones, i.e., carbonyl compounds having at least one hydrogen substituent present in the carbon atom adjacent to the carbonyl group. Examples of such tautomeric ketones and aldehydes include methyl dodecyl ketone, dihexyl ketone, ethyl octadecyl ketone, dodecyl aldehyde, behenyl aldehyde, dicyclohexyl ketone, etc.

The oil-soluble alcohols should contain at least about eight, and preferably less than about 30, aliphatic carbon atoms. They are illustrated by octanol, ethylcyclohexanol, dodecanol, octadecanol, behenyl alcohol, hexatriacontanol, 9-phenyloctadecanol, etc.

It will be noted that the terms "hydrocarbon," "alkyl," and "alkaryl" as they are used herein, describe sustances or groups which are essentially hydrocarbon in character. They may contain polar or non-hydrocarbon substituents provided that such substituents are not present in proportions so as to alter significantly the hydrocarbon character of the substance or group. The non-hydrocarbon substituents are exemplified by chloro, bromo, ether, keto, aldehydo, or iodo radicals. The upper limit of the proportion of such substituents in a hydrocarbon or a hydrocarbon group in most substances is about 10 percent by weight of the hydrocarbon portion of the substance or group.

The polymeric metal salt may be prepared by a variety of methods. Ordinarily it is obtained by treating an oleophilic substance from which the oleophilic group of the polymeric metal salt is derived, with an excess of a Group I or Group II metal base and an acidic gas such as carbon dioxide, sulfur dioxide or sulfur trioxide under conditions favorable to the formation of homogeneous basic complex. Such conditions usually include a temperature of from about 50° to 300°C or a higher temperature; the use of a promoter, i.e., one capable of facilitating the incorporation of the metal base into the oleophilic substance; and intimate mixing of the reactants for a period of time sufficient to form the homogeneous, basic complex.

The metal base useful in preparing the polymeric metal salt of this invention may be the bicarbonate, carbonate, oxide, hydroxide, hydride, lower alcoholate (i.e., derived from an alcohol having up to about six carbon atoms, such as methyl, ethyl, and isopropyl alcohols) of a Group I or Group II metal such as illustrated previously. The oxides and hydroxides of Group II metals, especially calcium or barium, are preferred.

The promoters used in preparing the polymeric metal salts are known in the art. The preferred ones are alcohols. They may be mercaptans, amines, aci-nitro compounds, or enolic compounds. The alcohols useful as the promoting agent include, for example, methanol, ethanol, isopropanol, cyclohexanol, decanol, dodecanol, behenyl alcohol, ethylene glycol, diethylene glycol, triethylene glycol, monomethyl ether of ethylene glycol, trimethylene glycol, hexamethylene glycol, glycerol, pentaerythritol, benzyl alcohol, phenylethyl alcohol. Other compounds useful as the promoting agent are illustrated by ethyl acetoacetate, acetylacetone, acetamide, ethanolamine, diethanolamine, triethanolamine, nitro-methane, nitro-propane, nitro-decane, nitrobenzene, nitro-toluene, methylamine, dimethylamine, aniline, phenylenediamine, N,N'-dimethylphenylenediamine, toluidine, cyclohexylamine, N-methyl decylamine, naphthylamine, thiophenol, methyl mercaptan, dodecyl mercaptan, isooctyl mercaptan, benzyl mercaptan, etc. Also contemplated are polymeric metal salts in which the oleophilic group is a carboxylic or phosphorus group such as described above which are prepared with phenols as the promoter.

A particularly useful method for preparing the polymeric metal salt involves preparing a mixture of an oleophilic substance and a stoichiometric excess of a metal base and treating the mixture at the desired temperature with an acidic gas until a homogeneous product is obtained. The process is carried out at a temperature from about 50° to about 300°C or any temperature below the decomposition point of the reaction mixture. The process is carried out preferably in the presence of a solvent or diluent such as mineral oil, benzene, xylene, dioxane, chloroform or naphtha. An especially useful solvent is one having a low pour point, such as halo-aryl or alkaryl hydrocarbon, e.g., chlorobenzene, p-cymene, mesitylene, etc. As the treatment with the acidic gas proceeds, the metal base is converted to the corresponding polymeric carbonat, sulfite or sulfate and forms a complex with the oleophilic stubstance. The product is a homogeneous complex which, for the purpose of this invention, is conveniently described as a polymeric metal salt because of the presence in its molecular structure of the polymeric unit $-(M-O-Y-O)_n-$, described previously. It should be noted that where a Group I metal is used in preparing the polymeric metal salt, it is believed that the metal depends for the formation of the complex on both primary and secondary valences and thus behaves as a divalent metal.

In many instances it is not necessary for all of the metal base present in the process mixture to be converted by the treatment with the acidic gas to a carbonate, sulfite, or sulfate complex. A homogeneous polymeric metal salt is often obtained when as little as about 75 percent of the metal base is converted by treatment with the acidic gas and such salt is contemplated for use in this invention.

The amount of the metal present in the polymeric metal salt is critical to the utility of the salt in the invention and so also are the relative amounts of the metal base and the oleophilic substance in the process by which the polymeric metal salt are made. The amounts of the reactants are most conveniently described in terms of their chemical equivalents, based on the number of the functional groups present in the molecule. For instance, an oleophilic substance having one polar radical per molecule has one equivalent per mole (e.g., didodecyl benzene sulfonic acid). A Group I metal base having one metallic group per molecule has one equivalent per mole; a Group I metal base having two metallic groups per molecule has two equivalents per mole; a Group II metal base having one metallic group per molecule has two equivalents per mole; and a Group II metal base having two metallic groups per molecule has four equivalents per mole; an oleophilic substance having two polar radicals in the molecule has two equivalents per mole (e.g., a substituted succinic acid or anhydride). The relative amounts of the metal and the oleophilic group in the polymeric metal salt are readily described by reference to the value of $n$ in the structural formula, shown previously, describing the polymeric metal salt. In most instances, from 2 to about 40 equivalents of the metal base per equivalent of the oleophilic substance is used in the process for preparing the polymeric metal salt. The preferred amount of the metal base is from about 4 to about 20 equivalents per equivalent of the oleophilic substance.

An alternative method for preparing the polymeric metal salt involves preparing an intermediate metal-containing reactant by mixing the metal base with a polar substance such as an alcohol or phenol with a promoter such as an alcohol or a phenol illustrated above and treating the intermediate with an acidic gas such as carbon dioxide to convert it either completely or partially to a carbonated complex and then mixing the complex with the above-illustrated oleophilic substance. The preparation of the complex is preferably carried out in the presence of a solvent or diluent such as mineral oil or the like and it may be carried out under anhydrous conditions or hydrous conditions depending for the most part on the oleophilic substance and the promoter used in the process. In most instances the preparaion of the complex involves a reaction temperature of from about 25°C to the boiling point of the promoter or the diluent which is usually below about 250°C.

Various methods of introducing the metal salt into the combustion zone of the engine are available. A convenient method is the injection of the metal salt as a powder into the combustion chamber. Another method involves preparing a mixture of the fuel and the metal salt and injecting the mixture into the combustion chamber. Another method involves dissolving the metal salt in a carrier in which both the metal salt and the fuel are soluble, dissolving the carrier and the metal salt in the fuel to prepare a solution and injecting the solution into the combustion chamber. Still another method involves preparing a polymeric metal salt, which is miscible with the fuel, dissolving the polymeric salt in the fuel and injecting the solution into the combustion chamber. In the last three methods, the metal salt is released in the desired form at the time when combustion of the fuel takes place. Other methods may be employed provided that they result in introducing the metal salt into the combustion chamber and releasing it in the desired, finely divided form during combustion.

The improved process of operating diesel engines of this invention is illustrated as follows: A single cylinder, four-stroke diesel engine is operated at 1,200 rpm and under a load of 18–20 brake-horsepower on a diesel fuel having a sulfur content of 0.4 percent. The engine is equipped with an injector adapted for the injection of the smoke suppressing agent into the combustion chamber through the air in-take opening. The engine is further equipped with a "smoke spot" apparatus for measuring the black exhaust smoke by allowing the exhaust gas to pass through a white filter paper in a sampling tube. In each series of tests, after a break-in operation to establish equilibrium conditions, the engine is operated on the diesel fuel, without a smoke suppressing agent, until a constant Smoke Spot Rating is obtained in one minute (usually within 4.5–7.5) (by comparing the filter paper with a set of standards, i.e., papers having various amounts of deposits and graded on a numerical scale of 0 to 10, 0 being indicative of no deposit and 10 being indicative of heavy deposit). The engine is then operated while the smoke suppressing agent is injected into the combustion chamber until equilibrium conditions are again established. After 20 seconds of operation and while the smoke suppressing agent is injected into the combustion chamber, the exhaust gas is allowed to pass through the filter paper for a period of one minute. The smoke spot rating of the engine is then noted and compared with the rating obtained without the use of the smoke suppressing agent. The higher the rating, the greater the tendency of the engine to form smoke. A number of metal salts have been evaluated as the smoke suppressing agent in the above-noted process and their effectiveness is shown by the results of Table I below.

TABLE I

| Test Series | Smoke Suppressing Agent | Size (micron) | Concentration (by weight) | Smoke Spot Rating |
| --- | --- | --- | --- | --- |
| I-a | None | — | — | 5.5 |
| I-b | CaCO₃ | 44–74 | 0.73% | 4.5 |
| I-c | CaCO₃ | 74–149 | 0.87% | 4.5 |
| I-d | CaCO₃ | 149–177 | 0.73% | 4.5 |
| I-e | CaCO₃ | <44 | 0.96% | 3.5 |
| II-a | None | — | — | 6.5 |
| II-b | BaSO₄ | 44–74 | 2.18% | 3.5 |

TABLE I-Continued

| Test Series | Smoke Suppressing Agent | Size (micron) | Concentration (by weight) | Smoke Spot Rating |
| --- | --- | --- | --- | --- |
| II-c | BaSO₄ | 250–297 | 2.55% | 4.5 |
| II-d | BaCO₃ | <44 | 2.85% | 2.5 |
| II-e | BaCO₃ | <44 | 0.52% | 4.5 |
| II-f | BaCO₃ | 250–297 | 3.92% | 3.5 |

The improved process of operating diesel engines of this invention is further illustrated as follows: A single-cylinder, four-stroke diesel engine is operated at 1,200 rpm and under a load of 18–20 brake-horsepower on a diesel fuel having a sulfur content of 0.4 percent. The engine is equipped with a "smoke spot" apparatus such as is described previously. In each series of tests, the engine is operated on the diesel fuel without a smoke suppressant agent until equilibrium conditions are established and the smoke spot rating is noted. The engine is then operated on the diesel fuel in which there is mechanically dispersed a powdered smoke suppressant agent. The engine is then operated until equilibrium conditions are again established. The smoke spot rating of the engine is then noted and compared with the rating obtained without the use of the smoke suppressant agent. The higher the rating, the greater the tendency of the engine to form smoke. A number of metal salts have been evaluated as the smoke suppressant agent in this process and their effectiveness is shown by the results of Table II below.

TABLE II

| Test Series | Smoke Suppressing Agent | Size (microns) | Concentration (by weight) | Smoke Spot Rating |
| --- | --- | --- | --- | --- |
| I-a | None | — | — | 6.0-6.5 |
| I-b | BaCO₃ | <44 | 0.12% | 4.4 |
| I-c | BaCO₃ | <44 | 0.47% | 2.25 |
| II-a | None | — | — | 7.5 |
| II-b | BaSO₄ | <44 | 0.13% | 7 |
| II-c | BaSO₄ | <44 | 0.52% | 5 |

The improved process of operating diesel engines of this invention is further illustrated as follows: A single cylinder, four-cycle diesel engine is operated under the following conditions: engine speed, 1,500 ± 10 rpm; fuel rate, 2.7 ± 0.04 lbs. per hour; and fuel, No. 2 diesel fuel having a sulfur content of 1 percent. The engine is equipped with a "smoke tube" apparatus for measuring the black exhaust smoke by allowing the exhaust gas to pass through a glass tube (outside diameter of 0.7 inch) in which the smoke is collected on the inside wall of the tube. The effectiveness of the additive to prevent the formation of black smoke is rated by comparing the tube with a set of standard tubes having various amounts of deposits and rated on a numerical scale of from 0 to 8, 0 being indicative of no deposit and 8 being indicative of heavy deposit. The engine is also equipped with a "smoke spot" apparatus such as described previously. After a break-in operation to establish equilibrium conditions, the engine is operated on the base fuel, without the smoke suppressing agent, until a constant Smoke Spot Rating is obtained (usually within the range of from 8.5 to 9.0) and a constant Smoke Tube Rating is obtained (usually within the range of from 6.0 to 6.5). The engine is then operated on the diesel fuel in which there is incorporated a polymeric metal salt (by dissolving the metal salt in the fuel). The polymeric metal salt is released during combustion in the form of finely divided particles having an average particle size of less than 100 microns. After equilibrium conditions are again established, the Smoke Tube Rating and the Smoke Spot Rating are recorded at specified intervals. The performance characteristics of the test fuels are shown by the results of Table III.

The test fuels are prepared by blending No. 2 diesel fuel with a mineral oil concentrate of a polymeric metal salt identified as follows: (all percentages are by weight unless otherwise specified):

Fuel A: Base fuel, i.e., No. 2 diesel fuel.

Fuel B: Base fuel containing 0.25 percent of a polymeric salt prepared by the procedure: A mixture of 730 parts (0.5 equivalent) of a neutral calcium bright stock sulfonate, 58 parts (0.3 equivalent) of heptylphenol, 57 parts of water, and 300 parts of toluene is heated to 70°C whereupon 123 parts (1.6 equivalents) of barium oxide is added over a period of 15 minutes. The mixture is then heated to 150°C and carbonated at the rate of 15 cubic feet per hour until carbon dioxide is no longer absorbed by the reaction mixture. The mixture is filtered and the filtrate is the desired basic barium sulfonate having a barium sulfate ash content of 17.3 percent, a metal ratio of 2.9, and a reflux base number of 58.

Fuel C: Base fuel containing 0.32 percent of a polymeric salt prepared by the procedure: A calcium phenate is prepared by the following procedure. A mixture of 2,250 parts of mineral oil, 960 parts (5 moles) of heptylphenol, and 50 parts of water is stirred at 25°C. The mixture is then heated to 40°C and 7 parts of calcium hydroxide and 231 parts (7 moles) of 91 percent paraformaldehyde is added over a period of 1 hour. After heating the mixture to 80°C., 200 additional parts of calcium hydroxide (making a total of 207 parts or 5 moles) is added over a period of 1 hour whereupon the mixture is heated to 150°C and maintained at that temperature for 12 hours while nitrogen is blown through the mixture to assist in the removal of water. If foaming is encountered, a few drops of polymerized dimethyl silicone foam inhibitor may be added to control the forming. The reaction mass is then filtered and the filtrate, a 33.6 percent oil solution of the desired calcium phenate of heptylphenol-formaldehyde condensation product, is found to contain 7.56 percent of calcium sulfate ash. A mixture of 1,000 parts of a neutral calcium bright stock sulfonate having a calcium sulfate ash content of 4.68 percent (60 percent mineral oil), 1207 parts of mineral oil, and 158 parts of the calcium phenate prepared above, 240 parts of an isobutyl-amyl alcohol mixture (65:35 mole per cent), 108 parts of methanol and 170 parts of calcium hydroxide is prepared. The mixture is stirred at 45°C and 50 parts of carbon dioxide is introduced over a period of 2 hours. thereafter, 3 additional portions of calcium hydroxide, each amounting to 114 parts, are added and each such addition is followed by the introduction of carbon dioxide as previously illustrated. A fourth portion, 114 parts, of calcium hydroxide is then added and 100 parts of carbon dioxide is added as above. This is then followed by the addition of another 114 parts of calcium hydroxide and 75 parts of carbon dioxide. The mixture is then heated to 150°C in 3.5 hours and maintained at this temperature while blowing with nitrogen for 4 hours. A filter aid is added and the mixture is filtered. The filtrate is the desired product having a calcium sulfate ash content of 39.4 percent and a metal ratio of 28.4.

Fuel D: Base fuel containing 0.5 percent of a polymeric salt prepared by the procedure: A mixture of 5,049 parts (3.5 equivalents) of a neutral calcium bright stock sulfonate having a calcium sulfate ash content of 4.68 percent (60 percent mineral oil), 401 parts (2.1 equivalents) of heptylphenol, and 342 parts of water is heated to 70°C whereupon 1,725 parts (22.4 equivalents) of barium oxide is added over a period of 2.5 hours. The mixture is heated to 150°C and carbonated until its base number (phenolphthalein indicator) is reduced to 8.4. Iso-octyl alochol (170 parts) and 1,000 parts mineral oil is added to the mixture which is then heated to 170°C with stirring to remove the water. The mixture is filtered and the filtrate is the desired basic barium bright stock sulfonate having a barium sulfate ash content of 23.7, a metal ratio of 4.3, and a reflux base number of 91.

Fuel E: Base fuel containing 0.5 percent of a polymeric salt prepared by the procedure: A basic calcium bright stock sulfonate having a barium sulfate ash content of 28.5 and a metal ratio of 17.6 is prepared according to the procedure of Fuel C. A mixture of 2,000 parts of this basic sulfonate, 126 parts of iso-octyl alcohol, 168 parts of methanol, and 134 parts of calcium hydroxide is heated to 46°C and carbonated with 50 parts of carbon dioxide over a period of 2 hours. An additional 134 parts of calcium hydroxide is added followed by carbonation with 100 parts of carbon dioxide. The mixture is then heated to 157°C/13–46 mm. and blown with nitrogen for 3 hours to remove the volatile materials. Filter aid is added and the mixture is filtered. The filtrate is the desired basic calcium bright stock sulfonate having a calcium sulfate ash content of 36.9 and a metal ratio of 35.

Fuel F: Base fuel containing 0.65 percent of a polymeric salt prepared by the procedure: A mixture of 61 parts of heptylphenol and 1,000 parts by weight of a chlorinated polyisobutene having a chlorine content of 4.3 percent, prepared from a polyisobutene with a molecular weight of 1,000, is heated to reflux (99°C) and 110 parts of phosphorus trichloride is added. Heating is continued until the reflux temperature reaches 200°C (in four hours). An additional 110 parts of phosphorus trichloride is then added and the mixture is heated at 200°C for 6½ hours, and then blown with nitrogen at 180°–200°C for two hours. The phosphorized polymer thus obtained is hydrolyzed by treatment with steam at 150°–160°C for three hours. The resulting hydrolyzed material has a phosphorus content of 2.2 percent and a chlorine content of 0.3 percent. A basic barium salt is prepared by carbonating a mixture of 270 parts of mineral oil, 18 parts of water, 143 parts of the phosphorized acid produced as described above, 38 parts of heptylphenol and 140 parts of barium oxide at 130°–140°C until the mixture is substantially neutral to phenolphthalein. The mixture is dried by blowing with nitrogen at 155°C and is diluted with mineral oil to a barium sulfate ash content of 25 percent. The final solution contains 0.41 percent phosphorus and has a reflux base number of 107 and a metal ratio of 8.3.

Fuel G: Base fuel containing 0.42 percent of a polymeric salt prepared by the procedure: A mineral oil solution of calcium bright stock sulfonate (4 equivalents) is mixed with heptylphenol (2.4 equivalents), water and barium oxide (19.2 equivalents) and treated with carbon dioxide at 150°C in the presence of a catalytic amount of barium chloride until the base number of the mixture is 80 (phenolphthalein indicator). The product is filtered and the filtrate is an oil solution of a polymeric metal salt having a barium sulfate ash content of 26.42 percent and a reflux base number of 104. The polymeric metal salt thus contains 4.6 equivalents of metal per equivalent of the oleophilic group derived from a bright stock sulfonate.

Fuel H: Base fuel containing 1.3 percent of a mixture of two polymeric metal salts: The one polymeric metal salt is that of Fuel C and the other polymeric metal salt is obtained by treating a mixture of a barium mahogany sulfonate (1 equivalent) and barium hydroxide (1.34 equivalents) with carbon dioxide at 94°-150°C.

Fuel I: Base fuel containing 0.35 percent of a polymeric salt prepared as follows: A mixture of 1,000 parts by weight of a polyisobutene having a molecular weight of 1,000 and 90 parts by weight of phosphorus pentasulfide is heated to 260°C over five hours and is then maintained at that temperature for an additional five hours, in an atmosphere of nitrogen. It is then cooled to 150°C and blown with steam for 5 hours. The resulting phosphorized-hydrolyzed material has a phosphorus content of 2.35 percent and a sulfur content of 2.75 percent. A suspension of barium hydroxide in mineral oil is prepared by mixing 2,200 parts of oil with 1,150 parts of barium oxide and blowing the mixture with steam for three hours at a temperature of about 150°C. To the barium hydroxide suspension is added, at 145°-150°C., 1,060 parts of the phosphorized acid prepared as described above. The addition is complete in three hours. After mixing for 30 minutes, 360 parts of heptylphenol is added over 1-½ hours at 150°C. The resulting mixture is blown with carbon dioxide for four hours at 150°C., after which 850 parts of oil is added and the material is dried by blowing with nitrogen. The dried material is filtered and the filtrate is diluted with mineral oil to a barium sulfate ash content of 25 percent. The product has a phosphorus content of 0.38 percent, a sulfur content of 0.48 percent, a reflux base number of 103 and a metal ratio of 8.6.

Fuel J: Base fuel containing 0.65 percent of a polymeric metal salt prepared as follows: A suspension of 311 parts by weight of barium hydroxide in 485 parts of mineral oil is heated to 140°-150°C., and 300 parts of a phosphorized and hydrolyzed acid prepared as described in Fuel I is added over a 1-hour period. Heptylphenol, 153 parts, is added over one-half hour and the mixture is then blown with carbon dioxide for 2.3 hours at 150°-155°C. At the end of this time, 181 parts of barium hydroxide is added over 30 minutes and carbonation is continued. An additional 181 parts of barium hydroxide is added two hours later. Carbon dioxide addition is continued for 2½ hours, and finally 274 parts of mineral oil is added. The solution is dried by blowing nitrogen through at a temperature of 150°C and is then filtered. After filtration, mineral oil is added to dilute the solution to a barium sulfate ash concentration of 38.5 percent. The product thus obtained has a phosphorus content of 0.35 percent, a sulfur content of 0.38 percent, a reflux base number of 168 and a metal ratio of 14.2.

Fuel K: Base fuel containing 0.36 percent of a polymeric metal salt prepared by treating a mixture of a polyisobutene (molecular weight of 1,000)-substituted succinic anhydride (0.81 equivalent), heptylphenol (1 equivalent), and barium hydroxide (9.8 equivalents) with carbon dioxide.

Fuel L: Base fuel containing 0.294 percent of a polymeric metal salt prepared by treating a calcium mahogany sulfonate and calcium hydroxide (14 equivalents of calcium per equivalent of mahogany sulfonate) with carbon dioxide in the presence of an alcohol mixture as the promoter (mixture of methyl, isobutyl, and pentyl alcohols).

Fuel M: Base fuel containing 1.19 percent of a polymeric metal salt prepared by treating a mixture of a hydrolyzed reaction product (1.66 equivalents) of polyisobutene (molecular weight of 1,000) and phosphorus pentasulfide, and heptylphenol (1 equivalent) and barium hydroxide (5.1 equivalents) with carbon dioxide.

Fuel N: Base fuel containing 1.19 percent of a polymeric metal salt prepared as follows: A mixture of 2,140 parts by weight of polyisobutene having a molecular weight of 1,000 and 317 parts of phosphorus pentasulfide is heated to 232°C over a 5-hour period and maintained at 232°-237°C for five hours. Steam is then passed through the mixture at 232°-237°C for thirteen hours. The phosphorized product is dried by blowing with nitrogen at 232°C for one hour. A suspension of 314 parts of barium oxide in 950 parts of mineral oil is blown with steam for 2½ hours. The phosphorized product prepared as described above is added over a 3-hour period, at a temperature of 135°-140°C. The reaction mixture is blown with steam at this temperature for one hour and an additional 592 parts of mineral oil is added. Water is removed by blowing with nitrogen at 150°C for 2 hours, after which the reaction mixture is filtered. To a mixture of 855 parts of the barium salt produced as described above, 321 parts of oil and 82 parts of heptylphenol, at a temperature of 80°C., is added 216 parts of barium oxide over a 30-minute period. The reaction mixture is blown with steam for 2½ hours, and then with carbon dioxide for 5½ hours, at a temperature of 135°-140°C. Water is removed by blowing with nitrogen at 150°-155°C for 5 hours and the material is filtered. The filtrate is diluted with oil to a barium sulfate ash concentration of 21 percent. The product produced by the above method contains 0.9 percent phosphorus and 0.35 percent sulfur, has a reflux base number of 72 and a metal ratio of 3.0.

Fuel O: Base fuel containing 1.16 percent of a polymeric metal salt prepared as follows: A chlorinated polyethylene oil (molecular weight 610) containing 4.3 percent chlorine is phosphorized by the following procedure. One mole (610 grams) of the oil is heated to 100°C and one-half of a 137.5-gram (1 mole) portion of phosphorus trichloride is added. The reaction mixture is heated to 210°C over a 14-hour period, while the remainder of the phosphorus trichloride is added slowly. About 20 grams of unreacted phosphorus trichloride is removed at 180°C/20 mm. To the reaction mixture is added 305 grams of mineral oil, and the mixture is blown with steam for two hours at 140°-160°C and then dried at 150°C/30 mm. A mixture of 420 grams of the phosphorized-hydrolyzed material thus obtained, 66 grams of heptylphenol, 347 grams of mineral oil and 25 grams of water is heated to 70°C and 211 grams of barium oxide is added in small increments over 30 minutes. The mixture is heated to 150°C and blown with carbon dioxide until a neutral product is obtained. The product is then filtered. The filtrate contains 26.4 percent barium sulfate ash and 0.53 percent phosphorus, and has a metal ratio of 6.6.

Fuel P: Base fuel containing 0.97 percent of a polymeric metal salt prepared as follows: A mixture of 800 grams of polyethylene (molecular weight 2,500) and 25.6 grams of sulfur is heated to 160°C. To the mixture is added, over 45 minutes, 88 grams of phosphorus trichloride. The reaction mixture is heated for seven hours at 160°–165°C., after which the pressure is reduced to 30 millimeters and 31 grams of $PSCl_3$ is removed by distillation. To the remaining material is added 400 grams of mineral oil, and the mixture is blown with steam for one hour at 150°C. It is then heated at 150°C/30 mm. to remove water and filtered. To 840 grams of the phosphosulfurized product obtained as described above are added 132 grams of heptylphenol, 300 grams of mineral oil and 50 grams of water. The mixture is heated to 70°C and 423 grams of barium oxide is added. The mixture is then heated to 150°C over about 1½ hours and is blown with carbon dioxide until it becomes slightly acidic. During the carbon dioxide treatment, 50 grams of isooctyl alcohol is added to decrease the viscosity of the mixture. An additional 300 grams of mineral oil is then added and the solution is filtered. The filtrate contains 0.25 percent phosphorus and 22.69 percent barium sulfate ash, and has a metal ratio of 12.1.

Fuel Q: Base fuel containing 1.38 percent of a polymeric metal salt prepared by treating a mixture of a hydrolyzed reaction product (0.0353 equivalent) of a polyisobutene (molecular weight of 1,000) and phosphorus pentasulfide, heptylphenol (1 equivalent) and barium oxide (6.6 equivalents) with carbon dioxide.

TABLE III

| Test Fuel | Smoke Spot Rating (30-second interval) | Smoke Tube Rating (15-second interval) |
| --- | --- | --- |
| Base Fuel A (containing no smoke suppressing agent) | 8.0–9.0 | 5.5–6.5 |
| Fuel C | 8.0 | 3.5 |
| Fuel C (except the concentration of the additive is 0.64%) | 6.5 | 1.5 |
| Fuel J | 5.0 | 2.5 |
| Fuel K | 5.5 | 2.0 |
| Fuel L | 5.5 | 2.0 |
| Fuel M | 6.0 | 2.5 |
| Fuel N | 6.0 | 2.5 |
| Fuel Q | 3.5 | 0.5 |

The polymeric salts include especially those described in co-pending applications Ser. No. 665,934, filed Sept. 6, 1967, now abandoned; Ser. No. 474,497, filed July 23, 1965, now abandoned; and Ser. No. 486,558, filed Sept. 10, 1965 now abandoned. The specification of each of said co-pending applications is hereby incorporated by reference in the present specification. The polymeric salts in which the oleophilic group is derived from a bright stock sulfonic acid, such as are described in co-pending application Ser. No. 665,934, are characterized by an unusual ability to impart emulsion resistance to fuels. The emulsion resistance of the metal compositions of this invention is shown by the results shown in Table IV, of an Emulsibility Test. The test consists of preparing a mixture of 100 cc of a diesel fuel and 1 cc of water, placing it in a 4-ounce, square glass bottle (width and depty dimension of 1¾ × 1¾ inches), homogenizing the mixture, and then allowing the mixture to stand at room temperature to allow a separation of the water layer and the fuel layer. At the end of periods of standing of 5 minutes, 3 hours, 6 hours, and 24 hours, the sample is inspected for turbidity by placing a newspaper print behind the bottle and viewing it through the fuel layer of the sample. The turbidity is then rated on a numerical scale from 0 to 3, 0 being indicative of a clear sample (i.e., complete separation of the water layer and the fuel layer) and 3 being indicative of cloudiness of the sample to the extent that the newspaper print is completely illegible. A lower rating indicates a higher emulsion resistance. The fuel used in the test is a No. 2 diesel fuel. For purpose of comparison, a commerical barium mahogany sulfonate detergent is also tested and its great tendency to promote emulsion of water and fuel is shown by the results in Table IV.

TABLE IV

Water Retention Test

| Additive | % by Weight in Fuel | Test Results | | | |
| --- | --- | --- | --- | --- | --- |
| | | 5 min. | 3 hrs. | 6 hrs. | 24 hrs. |
| none | — | 0–1 | 0 | 0 | 0 |
| Basic Ba Mahogany Sulfonate | 0.5 | 2–3 | 3 | 3 | 3 |
| Polymeric Salt of Fuel B | 0.5 | 1 | 0 | ·0 | 0 |
| | 0.25 | 1–2 | 0–1 | 0 | 0 |
| Polymeric Salt of Fuel G | 0.5 | 1 | 0 | 0 | 0 |
| Polymeric Salt of Fuel D | 0.5 | 1–2 | 0 | 0 | 0–1 |
| Polymeric Salt of Fuel E | 0.5 | 0 | 0 | 0 | 0 |
| Polymeric Salt of Fuel C | 0.5 | 1 | 0 | 0 | 0 |
| | 0.25 | 0–1 | 0 | 0 | 0 |

An especially effective additive combination consists of a polymeric metal salt described in co-pending application Ser. No. 486,558, i.e., in which the oleophilic group is derived from an acidic phosphorized aliphatic or aliphatically-substituted aromatic hydrocarbon, and another polymeric metal salt in which the oleophilic group is derived from an oil-soluble sulfonic acid. The latter is exemplified by a carbonated calcium sulfonate with a high metal ratio such as is prepared by reacting an oil-soluble sulfonic acid or a neutral calcium sulfonate with an excess of a calcium base such as calcium oxide or hydroxide or alcoholate and carbonating the mixture in the presence of a promoter such as a phenolic compound or an alcohol described previously.

More specifically, it has been found that the tendency of a diesel fuel to form smoke is very effectively suppressed by adding to said fuel about 0.01–5 percent by weight of a combination of (1) a basic alkaline earth metal salt of an acidic phosphorized hydrocarbon and (2) a substantially neutral, carbonated calcium sulfonate complex having a metal ratio of at least about 10.

Such carbonated calcium sulfonates with high metal ratios may be prepared by the method described in co-pending application Ser. No. 309,293, filed Sept. 16, 1963. Briefly, this method comprises reacting a carbonated calcium sulfonate complex having a metal ratio of about 1.1–8.0 with a calcium base in the presence of an oil-soluble calcium phenate and an aliphatic monohydric alcohol or mixture of such alcohols, the ratio of the number of equivalents of the calcium base to the calcium sulfonate complex being at least about 10:1, and then treating the mixture with carbon dioxide to a base number below about 20 and heating to drive off volatile constituents (e.g., alcohol and water). The following examples are typical.

EXAMPLE 1

Part A

One thousand parts of a 51 percent mineral oil solution of neutral sodium mahogany sulfonate having a sodium sulfate ash content of 8.5 percent is heated to 95°–100°C. with stirring, and a solution of 71.3 parts of calcium chloride in 84 parts of water is added. Stirring and heating are continued for two hours, and then 72 parts of lime is introduced. After an additional two hours of stirring at 95°–100°C. to remove most of the water, the oil solution is cooled to 48°C. and 130 parts of methanol is added. The mixture is blown with carbon dioxide at 43°–48°C. to a base number of 4–8, heated to 150°C. to remove the methanol and remaining water, and filtered.

Part B

A mixture of 960 parts of heptylphenol, 2,250 parts of mineral oil and 50 parts of water is heated to 40°C. and 231 parts of paraformaldehyde is added over 45 minutes, followd by 6.6 parts of lime. The mixture is heated to 80°–89°C. and charged with an additional 200 parts of lime over 45 minutes. Water is removed at 150°C. by blowing with nitrogen, 50 parts of filter aid is added and the product is filtered.

Part C

A mixture of 15,972 parts of the carbonated calcium sulfonate of Part A, 804 parts of the calcium heptylphenate of Part B, 5,000 parts of mineral oil, 2,800 parts of methanol and 1,405 parts of a mixture of 64 percent (by weight) isobutyl alcohol and 36 percent amyl alcohol is heated to 46°C., with stirring, and 1,490 parts of lime are added. The mixture is then blown with carbon dioxide at 42°–52°C. until a direct base number between 40 and 50 is attained. Three additional 1,490-part portions of lime are successively introduced, each one being followed by carbon dioxide treatment. In the final CO₂ treatment, the direct base number is lowered to 35–45. Alcohol and water are removed by stripping at 80°–155°C., and the residue is filtered in the presence of a filter aid. The product has a calcium sulfate ash content of 40.0 percent.

Example 2

To a mixture of 1,685 parts of the calcium sulfonate of Example 1, Part A; 84 parts of the calcium phenate of Example 1, Part B; and 559 parts of mineral oil, is added 157 parts of lime. The mixture is heated with stirring at 50°C., and 148 parts of a mixture of 64 percent (by weight) isobutyl alcohol and 36 percent amyl alochol and 296 parts of methanol are added. Carbon dioxide is passed through the mixture for two hours and then three more 157-part portions of lime are introduced, with carbon dioxide treatment for 3½ hours following the addition of each portion. The volatile material is then removed by stripping at about 160°C. and the product is filtered. The material thus obtained has a calcium sulfate ash content of 43 percent.

What is claimed is:

1. A combustion process involving the burning of a diesel or jet fuel in an internal combustion engine tending to produce smoke, comprising burning said fuel in the presence of a black exhaust smoke-reducing amount of a basic metal-containing composition having the formula

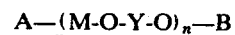

wherein M is a Group I or Group II metal, Y is carbonyl group, n is greater than 1, A is an oleophilic anionic group having at least about eight aliphatic carbon atoms and B is a chain ending group selected from the group consisting of hydrogen or -MA where M and A are as previously defined.

2. The process of claim 1 wherein M is barium and Y is carbonyl.

3. The process of claim 1 wherein M is calcium and Y is carbonyl.

4. The process of claim 1 wherein the basic metal-containing composition has the formula

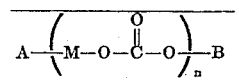

wherein M is barium or calcium, $n$ is at least 2, A is an oleophilic anionic group having at least about 8 aliphatic carbon atoms and B is a chain ending group and said basic metal-containing composition is present in an amount of at least about 0.01 percent by weight to 5 percent by weight of the fuel.

5. The process of claim 4 wherein the oleophilic group is derived from a hydrocarbon sulfonic acid having at least about 12 aliphatic carbon atoms in the hydrocarbon radical.

6. The process of claim 1 which comprises operating the engine on a diesel or jet fuel having incorporated therein from about 0.01 to about 5 percent by weight of an oil-soluble, carbonated basic alkaline earth metal salt of a bright stock sulfonic acid.

7. The process of claim 6 wherein the alkaline earth metal salt is a calcium salt.

8. The process of claim 6 wherein the alkaline earth metal salt is a barium salt.

9. The process of claim 6 wherein the alkaline earth metal salt is prepared by the process which comprises carbonating a mixture comprising A. a bright stock sulfonic acid,
B. a promoter selected from the class consisting of alcohols, phenols, calcium phenates, mercaptans, aci-nitro compounds and enolic compounds, and
C. more than one equivalent of an alkaline earth metal base per equivalent of (A), at a temperature of from about 25°C. to the boiling point of the mixture, and thereafter heating the carbonated mixture to remove the volatile components.

10. The process of claim 6 wherein the alkaline earth metal salt is prepared by the process which comprises carbonating a mixture comprising A. a bright stock sulfonic acid,
B. an alcohol, and
C. more than one equivalent of an alkaline earth metal base per equivalent of (A), at a temperature of from about 25°C. to the boiling point of the mixture, and thereafter heating the carbonated mixture to remove the volatile components.

11. The process of claim 6 wherein the alkaline earth metal salt is prepared by the process which comprises carbonating a mixture comprising
  A. a bright stock sulfonic acid,
  B. a phenol, and
  C. more than one equivalent of barium or calcium hydroxide per equivalent of (A),
at a temperature of from about 25°C. to the boiling point of the mixture, and thereafter heating the carbonated mixture to remove the volatile components.

12. The process of claim 6 wherein the alkaline earth metal salt is prepared by the process which comprises carbonating a mixture comprising
  A. a bright stock sulfonic acid,
  B. from about 0.10 to about 10 equivalents per equivalent of (A), of an alcohol having less than about 12 carbon atoms, and
  C. more than one equivalent of barium or calcium hydroxide per equivalent of (A), at a temperature of from about 25°C. to the boiling point of the mixture, and thereafter heating the carbonated mixture to remove the volatile components.

13. The process of claim 6 wherein the alkaline earth metal salt is prepared by the process which comprises carbonating a mixture comprising
  A. a bright stock sulfonic acid,
  B. from about 0.25 to about 10 equivalents per equivalent of (A), of an alcohol having less than about 12 carbon atoms, and
  C. more than one equivalent of barium oxide per equivalent of (A),
at a temperature of about 25°C. to the boiling point of the mixture and thereafter heating the carbonated mixture to remove the volatile components.

14. The process of claim 6 wherein the alkaline earth metal salt is prepared by the process which comprises carbonating a mixture comprising
  A. a neutral calcium salt of a bright stock sulfonic acid,
  B. from about 0.25 to about 10 equivalents of heptylphenol per equivalent of (A), and
  C. more than one equivalent of barium oxide per equivalent of (A),
at a temperature of from about 25°C. to the boiling point of the mixture, and thereafter heating the carbonated mixture to remove the volatile components.

15. The process of claim 6 wherein the alkaline earth metal salt is prepared by the process which comprises carbonating a mixture comprising
  A. a neutral calcium salt of a bright stock sulfonic acid,
  B. from 0.25 to about 10 equivalents per equivalent of (A), of a mixture of an alcohol and a calcium phenate of a heptylphenolformaldehyde condensation product, the calcium phenate comprising up to 70 percent by weight of the mixture, and
  C. more than one equivalent of barium oxide per equivalent of (A),
at a temperature of about 25°C. to the boiling point of the mixture and thereafter heating the carbonated mixture to remove the volatile components.

16. A fuel for use in diesel or jet engines which contains about 0.01–5 percent by weight of a basic alkaline earth metal salt of an acidic phosphorized aliphatic or alkylaromatic hydrocarbon having a molecular weight of about 150–48,000.

17. A fuel for use in diesel or jet engines which contains about 0.01–5 percent by weight of a basic alkaline earth metal salt of an acidic phosphorized aliphatic hydrocarbon having a molecular weight of about 150–48,000; said salt being prepared by the process which comprises carbonating a mixture comprising
  A. an acidic phosphorized aliphatic hydrocarbon having a molecular weight of about 150–48,000;
  B. a promoter selected from the group consisting of alcohols, phenols, amines and mercaptans; and
  C. more than one equivalent of an alkaline earth metal base per equivalent of (A);
and thereafter heating the carbonated mixture to remove volatile constituents.

18. The fuel of claim 17 wherein the alkaline earth metal is barium.

19. The fuel of claim 18 wherein the aliphatic hydrocarbon is a polyisobutene.

20. In a method for operating a diesel or jet engine, the improvement which comprises burning a diesel or jet fuel having incorporated therein about 0.01–5 percent by weight of a basic alkaline earth metal salt of an acidic phosphorized aliphatic or alkylaromatic hydrocarbon having a molecular weight of about 150–48,000, thereby suppressing the tendency of said engine to form black exhaust smoke by improper combustion of said fuel.

21. In a method for operating a diesel or jet engine according to claim 20, the improvement which comprises burning a diesel or jet fuel having therein about 0.01–5 percent by weight of a basic alkaline earth metal salt of an acidic phosphorized aliphatic hydrocarbon, which salt is prepared by the process which comprises carbonating a mixture comprising
  A. an acidic phosphorized aliphatic hydrocarbon having a molecular weight of about 150–48,000;
  B. a promoter selected from the group consisting of alcohols, phenols, amines and mercaptans: and
  C. more than one equivalent of an alkaline earth metal base per equivalent of (A);
and thereafter heating the carbonated mixture to remove volatile constituents.

22. The method of claim 21 wherein there is also incorporated into the fuel about 0.01–5 percent of a substantially neutral, carbonated calcium sulfonate complex having a metal ratio of at least about 10, said complex being prepared by reacting a carbonated calcium sulfonate complex having a metal ratio of about 1.1–8.0 with a calcium base in the presence of an oil-soluble calcium phenate and an aliphatic monohydric alcohol, or mixture of such alcohols, the ratio of the number of equivalents of said calcium base to said calcium sulfonate complex being at least about 10:1; treating the mixture thus formed with carbon dioxide to a base number below about 20, and heating to drive off volatile constituents.

* * * * *

UNITED STATES PATENT OFFICE
CERTIFICATE OF CORRECTION

Patent No. 3,798,612           Dated March 19, 1974

Inventor(s) William Monroe LeSuer

It is certified that error appears in the above-identified patent and that said Letters Patent are hereby corrected as shown below:

At column 16, line 49, that is Claim 9, line 4, "A." should be --(A)--; line 50, that is Claim 9, line 5, "B." should be --(B)--; line 53, that is Claim 9, line 8, "C." should be --(C)--; line 61, that is Claim 10, line 4, "A." should be --(A)--; line 62, that is Claim 10, line 5, "B." should be --(B)--; line 63, that is Claim 10, line 6, "C." should be --(C)--.

At column 17, line 4, that is Claim 11, line 4, "A." should be --(A)--; line 5, that is Claim 11, line 5, "B." should be --(B)--; line 6, that is Claim 11, line 6, "C." should be --(C)--; line 14, that is Claim 12, line 4, "A." should be --(A)--; line 15, that is Claim 12, line 5, "B." should be --(B)--; line 18, that is Claim 12, line 8, "C." should be --(C)--; line 26, that is Claim 13, line 4, "A." should be --(A)--; line 27, that is Claim 13, line 5, "B." should be --(B)--; line 30, that is Claim 13, line 8, "C." should be --(C)--; line 38, that is Claim 14, line 4, "A." should be --(A)--; line 40, that is Claim 14, line 6, "B." should be --(B)--; line 42, that is Claim 14, line 8, "C." should be --(C)--; line 50, that is Claim 15, line 4, "A." should be --(A)--; line 52, that is Claim 15, line 6, "B." should be --(B)--; line 57, that is Claim 15, line 11, "C." should be --(C)--.

At column 18, line 11, that is Claim 17, line 7, "A." should be --(A)--; line 13, that is Claim 17, line 9, "B." should be --(B)--; line 15, that is Claim 17, line 11, "C." should be --(C)--; line 39, that is Claim 21, line 8, "A." should be --(A)--; line 41, that is Claim 21, line 10, "B." should be --(B)--; line 43, that is Claim 21, line 12, "C." should be --(C)--.

UNITED STATES PATENT OFFICE
CERTIFICATE OF CORRECTION

Patent No. 3,798,012            Dated March 19, 1974

Inventor(s) William Monroe LeSuer

It is certified that error appears in the above-identified patent and that said Letters Patent are hereby corrected as shown below:

Under "Related U.S. Application Data", line 5, "Ser. No. 468,558" should be --Ser. No. 486,558--; line 8, "Sept. 3, 1934" should be --Sept. 3, 1964--.

Signed and sealed this 1st day of October 1974.

(SEAL)
Attest:

McCOY M. GIBSON JR.            C. MARSHALL DANN
Attesting Officer               Commissioner of Patents